United States Patent [19]
Klancnik

[11] 4,171,820
[45] Oct. 23, 1979

[54] COLLET ASSEMBLY

[75] Inventor: Adolph V. Klancnik, Glenview, Ill.

[73] Assignee: Universal Automatic Corporation, Des Plaines, Ill.

[21] Appl. No.: 861,437

[22] Filed: Dec. 16, 1977

Related U.S. Application Data

[63] Continuation-in-part of Ser. No. 836,576, Sep. 26, 1977, abandoned.

[51] Int. Cl.² ............................................. B23B 31/20
[52] U.S. Cl. ...................................................... 279/50
[58] Field of Search ............................... 279/50, 43, 57

[56] References Cited

U.S. PATENT DOCUMENTS

| 2,728,579 | 12/1955 | Djidich | 279/50 X |
| 3,292,939 | 12/1966 | Lorenz | 279/50 |
| 3,533,636 | 10/1970 | Firestone et al. | 279/50 X |
| 3,615,100 | 10/1971 | Banner | 279/50 |

Primary Examiner—Gil Weidenfeld
Attorney, Agent, or Firm—Kinzer, Plyer, Dorn & McEachran

[57] ABSTRACT

A collet assembly in which actuation is resisted by a spring washer sandwiched between two wear rings, in which the collet sleeve may be pre-tensioned by a conveniently located nut and in which end thrust is adsorbed by needle bearings.

6 Claims, 8 Drawing Figures

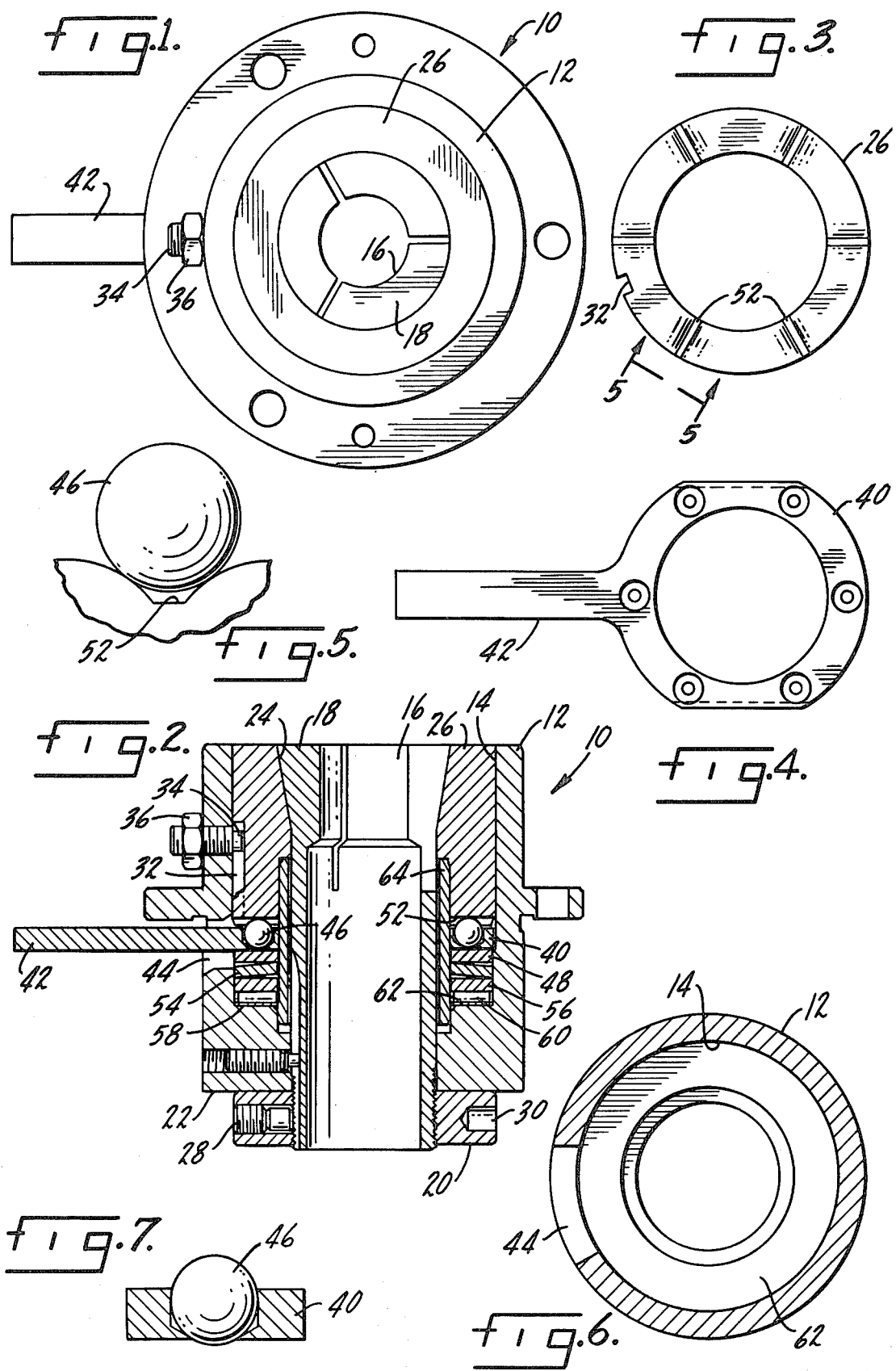

COLLET ASSEMBLY

REFERENCE TO A RELATED APPLICATION

This application is a continuation-in-part of application Ser. No. 836,576, filed Sept. 26, 1977 now abandoned.

This invention relates to a collet assembly, and in particular one in which the collet is closed by turning an actuator disc which supports a ring of balls responsible for exerting an axial thrust on a sleeve having an internal taper for contracting the collet on the part positioned in the bore of the collet.

The primary objects of the invention are to nest the parts conveniently both for assembly and disassembly, to isolate a resilient element which normally holds the balls seated, thereby to reduce stress and wear on the resilient element, to enable a needle-type thrust bearing neatly to be contained in the nest and to so construct the nest that the collet may be pulled back by a nut to pretension the collet.

IN THE DRAWING:

FIG. 1 is an end view of the collet assembly;

FIG. 2 is a sectional view of the collet assembly;

FIG. 3 is an end view of the collet actuator sleeve or locking cam;

FIG. 4 is a plan view of the actuator disc;

FIG. 5 is a detail view of a ball in its seat;

FIG. 6 is a sectional view of the housing;

FIG. 7 is a detailed sectional view showing a fragment of the actuator disc on an enlarged scale;

Figure 8:
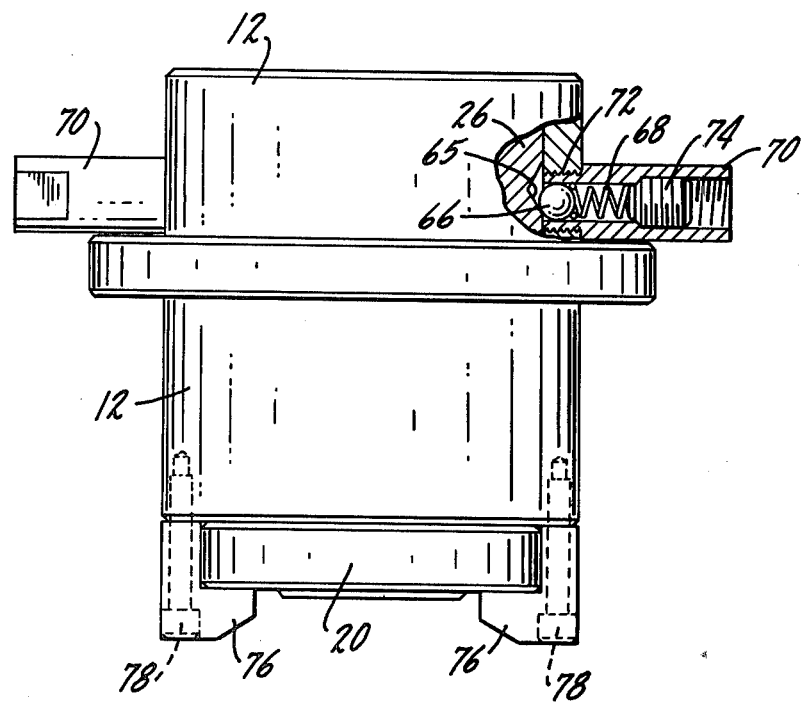
FIG. 8 is an elevational view, partly in section, showing a modified form of the collet assembly.

The collet assembly of the present invention 10, FIG. 1, comprises an outer housing 12 of circular form, affording an internal nest 14 in which all the operating parts are located.

The collet 16 includes the usual split end 18 having an external taper at the operating end. The collet is of sleeve form and the opposite end is extended outward of the housing 12. The opposite end of the collet is threaded and an adjusting nut 20 is secured thereto in opposed relation to the end shoulder 22 of the housing 12. By adjusting the nut, the collet may be pulled or drawn backward so that the external taper at the operating end may be wedged progressively in contact with the internal taper 24 presented by a locking cam or actuator sleeve 26 positioned in the nest presented by the housing 12. In this fashion, pretension may be applied to the split end of the collet and after the desired tension has been applied the position of the nut is maintained by tightening a set screw 28. The circumferential surface of nut 20 is provided with a plurality of openings 30 so that a tool may be applied thereto incidental to tightening or loosening the nut.

The actuator sleeve 26 is provided with an axial slot 32 in which is set a dog point 34 retained by a jamb nut 36, preventing rotation of the actuator sleeve 26.

To actuate the collet, the actuator sleeve 26 is extended axially, in a manner to be described, to present the more narrow part of the tapered bore 24 to the external taper on the collet. During this movement the dog point 34 serves as a guide. To extend the actuator sleeve 26, rotation is imparted to an actuator disc 40. The actuator disc 40, FIG. 4, is provided with a handle 42 projecting through a slot 44 at one side of the housing 12 as shown in FIG. 6.

Thus, rotation of disc 40, within the limits of the slot 44 (see FIG. 6), imparts an outward end thrust on sleeve 26 and this is accomplished by a ring of balls 46 retained in ball sockets formed in disc 40.

The ring of balls 46 is captured between the opposed end of the actuator sleeve 26 and a reaction wear member of ring or washer form 48.

The ball ring, in exerting end thrust, accomplishes this by a cam action and accordingly, as shown in FIG. 3 and FIG. 5, the inner end of the actuator sleeve 26 is provided with a plurality of slots 52 affording seats for the balls 46. As will be explained in more detail below, a spring washer 54 normally applies thrust to the actuator disc and the interposed wear ring 48. Thus, when the actuator disc is rotated, the balls 46 are displaced from the seats 52 and as an incident to such displacement, the balls 46 exert end thrust at the under side of the actuator sleeve 26, moving it outward of the nest with the result that the internal taper 24 wedges on the external taper of the collet 16, contracting the latter on the part positioned in the collet bore.

End thrust sufficient normally to seat the balls, with the collet actuator sleeve retracted, is exerted by a spring (conical) washer 54 as noted above. The spring washer 54 is nested between the wear ring 48 and a supporting washer 56. In turn, the supporting washer 56 reposes on a thrust bearing in the form of a disc 58 supporting a plurality of radially extending needle bearing elements 60. The thrust bearing reposes on an internal shoulder 62 formed in the housing 12.

To protect the parts against chips, the internal bore of the actuator sleeve and the housing are back cut and a cover sleeve 64 is positioned therein.

In operation, nut 20 is first adjusted to apply pre-tension, that is, to constrict the collet by an amount which enables the work piece to be positioned by a slip fit. At the time of establishing pre-tension, the actuator sleeve 26 will be in its retracted position, with the balls seated in slots 52, so that the collet is pulled downward or backward during pre-tensioning adjustment of nut 20. Afterwards, with the part positioned in the collet, torque is applied to handle 42 resulting in rotation of the actuator ring or disc 40, unseating the balls 46 and resulting in an outward end thrust on the actuator sleeve. During this motion, a great deal of force is exerted by the balls 46 on the wear ring 48. This being so, the wear ring 48 is formed of a hardened bearing steel, equally true of the metal employed for washer 56 which reposes on the thrust needles 60.

The parts are easily assembled in the nest, noting that the slot 44 is chamfered to enable the handle 42 to fit therethrough from the inside of the nest; also, sleeve 64 may be easily slipped into position. The thrust bearing, the spring washer and the two rings which sandwich the spring washer are all the same diameter. By having the spring washer sandwiched between the two wear rings, the latter can be made of a hard, wear resistant steel (e.g. 51000 Steel Alloy) so as to be interchangeable while a superior spring steel may be selected for the spring washer itself; also, the spring is protected against wear and tends to be uniformly flexed by virture of its conical form and by virtue of being contained between the two wear rings.

The arrangement also makes possible a convenient pre-tensioning nut and thrust bearing positioning.

There is a chance the sleeve, though released to relax the collet, might stick due to friction, especially if chips are trapped between the sleeve and collet. To assure prompt and positive retraction of the locking sleeve 26 when the actuator disc or ring is turned to present the seats 52 to the balls 46, a spring biased cam or return means, reactably mounted on the housing 12, applies a return thrust, axially, to the sleeve 26. Thus, the lock sleeve is normally spring retracted in a modified form of the collet assembly.

Specifically, as shown in FIG. 8, the outer surface of sleeve 26 is notched at 65 to present a cam surface in which is seated a spring biased ball detent 66 tending to apply an axial thrust to the sleeve cam seat 65 in the collet release direction.

To urge the ball 66 against the cam surface 65, a coil spring 68 applies a radial inward thrust against the ball. The spring 68 is retained inside the bore of a plunger stud 70 supported in a tapped opening 72 formed in the housing 12. The bore of the stud 70 is threaded and an adjusting set screw 74 is positioned therein enabling more or less thrust to be applied to ball 66 by spring 68.

As will be evident from FIG. 8 there is a second stud 70 (left side of the housing) containing the parts shown in section so the return thrust on sleeve 26 is balanced by a second ball as 66.

To prevent the collet from being retracted with the locking sleeve, during collet release, a positive stop engageable with nut 20 is provided on the housing 12. This stop may include two lugs having fingers 76 engaging the outer surface of nut 20; the lugs are fastened to housing 12 by cap screws 78. There is a clearance of several thousandths of an inch between the nut 20 and fingers 76.

I claim:

1. In a collet assembly, a housing affording an internal collet nest, a collet actuator sleeve member positioned inside the nest and presenting an internal taper for receiving an external taper on the split end of the collet, said sleeve member being guided for outward actuating movement relative to the housing to present the narrower part of said internal bore to the split end of the collet to apply a circumferential contracting force thereto, a rotatable actuator disc in the nest supporting a plurality of balls engaged with the inner end of the sleeve member, a first wear ring member, engaged with the balls, located in the nest on the side of the actuator disc opposite the sleeve member, one of said members having seats in which the balls normally repose in a retracted position of the sleeve member such that on rotating said actuator the balls are unseated to actuate the sleeve member outward, a spring washer in the nest engaged with said wear ring member normally to urge the balls into their seats, and a second wear ring member engaged with said spring washer on the side thereof opposite the first wear ring member.

2. A collet assembly according to claim 1 in which the opposite end of the collet is threaded, and a nut on said threaded end bearing against an opposed shoulder on the housing to draw the collet backward against said internal taper thereby to pre-tension the collet.

3. A collet assembly according to claim 1 having a needle thrust bearing in the nest, engaging the second wear ring member on the side thereof opposite said spring washer, to ease the thrust when the actuator disc is rotated.

4. A collet assembly according to claim 1 having an adjustable spring bias means exerting an axial return thrust on the sleeve member normally to retract the sleeve.

5. A collet assembly according to claim 2 having a spring bias means exerting an axial retracting thrust in the sleeve member, and a stop, mounted on the housing, engaging the nut to prevent retraction of the collet with the sleeve.

6. A collet according to claim 5 in which spring bias means is a spring biased ball detent engaged with a cam surface on the sleeve.

* * * * *